United States Patent
Dasgupta et al.

(10) Patent No.: US 9,875,218 B2
(45) Date of Patent: Jan. 23, 2018

(54) DOCUMENT SUMMARIZATION

(71) Applicant: INTERNATIONAL BUSINESS MACHINES CORPORATION, Armonk, NY (US)

(72) Inventors: Diptiman Dasgupta, Kolkata (IN); Radha M. De, Howrah (IN); Indrajit Poddar, Sewickley, PA (US)

(73) Assignee: International Business Machines Corporation, Armonk, NY (US)

( * ) Notice: Subject to any disclaimer, the term of this patent is extended or adjusted under 35 U.S.C. 154(b) by 95 days.

(21) Appl. No.: 14/166,098

(22) Filed: Jan. 28, 2014

(65) Prior Publication Data
US 2015/0213120 A1    Jul. 30, 2015

(51) Int. Cl.
*G06F 17/00* (2006.01)
*G06F 17/21* (2006.01)
*G06F 17/30* (2006.01)
*G06F 17/27* (2006.01)

(52) U.S. Cl.
CPC ........ *G06F 17/211* (2013.01); *G06F 17/2745* (2013.01); *G06F 17/30011* (2013.01); *G06F 17/30719* (2013.01)

(58) Field of Classification Search
CPC ............... G06F 17/211; G06F 17/2745; G06F 17/30719; G06F 17/30011
See application file for complete search history.

(56) References Cited

U.S. PATENT DOCUMENTS

| 5,752,228 | A  | * | 5/1998  | Yumura    | G10L 21/04 704/231 |
| 5,924,108 | A  |   | 7/1999  | Fein et al. | |
| 6,424,362 | B1 |   | 7/2002  | Bornstein et al. | |
| 7,194,693 | B2 |   | 3/2007  | Cragun et al. | |
| 7,395,501 | B2 |   | 7/2008  | Graham et al. | |
| 7,711,737 | B2 |   | 5/2010  | Surendran | |
| 7,861,149 | B2 |   | 12/2010 | Wang et al. | |
| 8,229,949 | B2 |   | 7/2012  | Yamasaki et al. | |
| 8,769,008 | B1 | * | 7/2014  | Young | H04W 4/02 709/201 |
| 2012/0117475 | A1 |   | 5/2012  | Lee et al. | |
| 2012/0210203 | A1 | * | 8/2012  | Kandekar | G06F 17/241 715/230 |

(Continued)

FOREIGN PATENT DOCUMENTS

| WO | 03017142 | A1 | 2/2003 |
| WO | 2010002275 | A2 | 1/2010 |

OTHER PUBLICATIONS

V. Qazvinian et al., "Generating Extractive Summaries of Scientific Paradigms", AI Access Foundation, Journal of Artificial Intelligence Research 46, 2013, pp. 165-201.

(Continued)

*Primary Examiner* — Augustine K Obisesan
*Assistant Examiner* — Lahcen Ennaji
(74) *Attorney, Agent, or Firm* — Law Office of Jim Boice

(57) ABSTRACT

A computer implemented method, system and a computer program product is provided for summarizing a document which includes receiving a reading speed of the reader, determining a summary length of a summary of the document based on the received reading speed of the reader, and generating a summary of the document having the determined summary length.

17 Claims, 3 Drawing Sheets

(56) References Cited

U.S. PATENT DOCUMENTS

| | | | |
|---|---|---|---|
| 2013/0054786 A1 | 2/2013 | Ashear | |
| 2013/0100139 A1* | 4/2013 | Schliesser | G06T 11/00 345/467 |
| 2014/0188766 A1* | 7/2014 | Waldman | G06F 17/30994 705/400 |
| 2014/0234826 A1* | 8/2014 | Breznitz | G09B 7/00 434/362 |
| 2014/0331125 A1* | 11/2014 | Tigchelaar | G06F 17/211 715/249 |
| 2015/0277552 A1* | 10/2015 | Wilairat | G06F 3/013 386/244 |

OTHER PUBLICATIONS

G. Drzadzewski et al., "Exploring and Analyzing Documents With OLAP", ACM, Proceedings of the 5th Ph.D. Workshop on Information and Knowledge, New York, 2012, pp. 33-40.

\* cited by examiner

| Reading speed (in appropriate unit such as words/minute) | Summary Length (in appropriate unit such as no. of words) |
|---|---|
| X | $X_1$ |
| Y | $Y_1$ |
| Z | $Z_1$ |

DOCUMENT SUMMARIZATION

BACKGROUND

The present invention relates to summarization of documents.

The problem of identifying a gist of a document is conventionally referred to as the text summarization or document summarization problem. Traditional document-summarization techniques focus on the central idea of the text of the document. Various computer algorithms have been developed to automatically generate the summary of the document. However, there is a need to have a desired length of the generated summary of the document based on the reading habits of a reader of the document.

SUMMARY

A computer implemented method, system and a computer program product for summarizing a document is provided which includes receiving a reading speed of the reader, determining a summary length of a summary of the document based on the received reading speed of the reader, and generating a summary of the document having the determined summary length.

DETAILED DESCRIPTION

Figure 1:
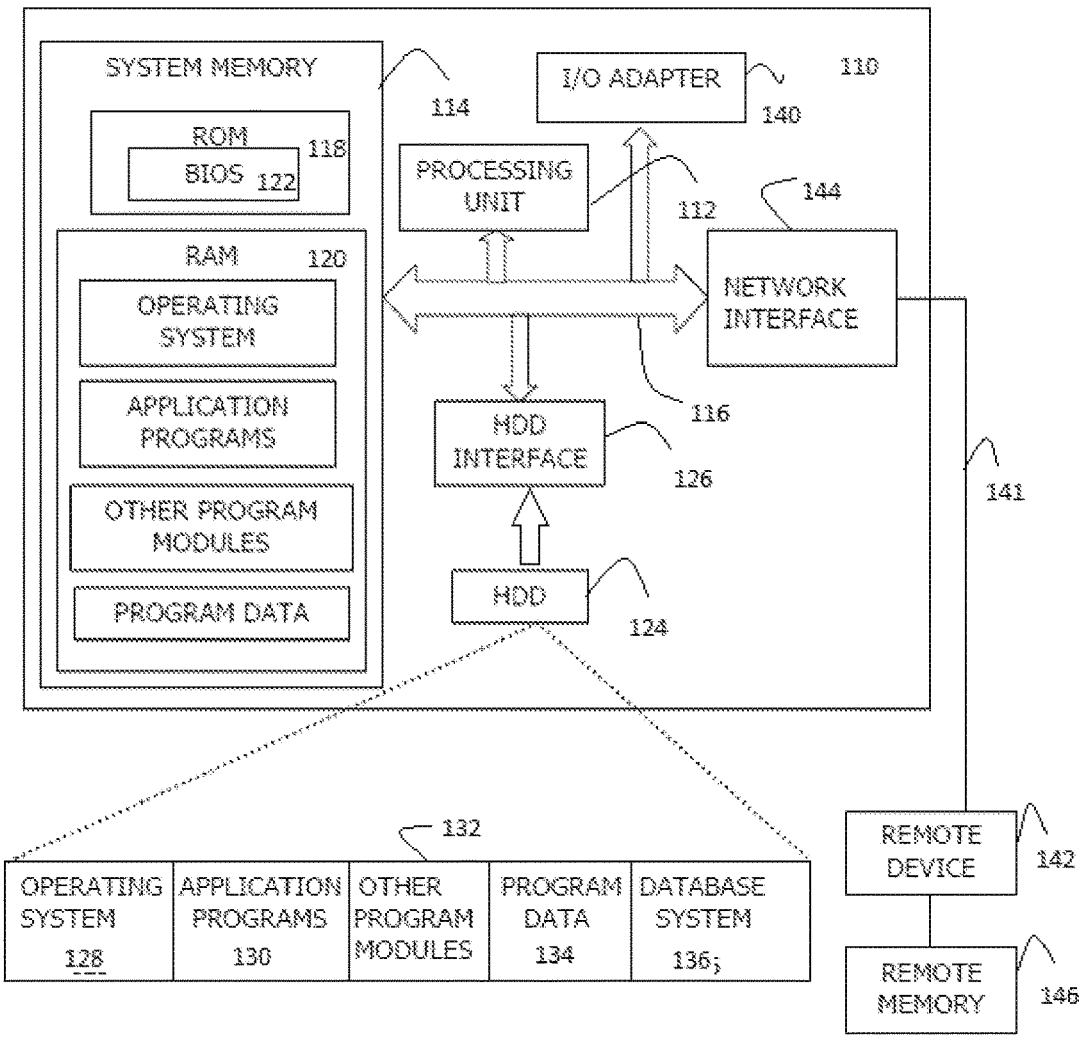
FIG. 1 illustrates a block diagram of a computing system for implementing embodiments of the present invention.

As will be appreciated by one skilled in the art, embodiments of the present invention may be embodied as a system, method or computer program product. Accordingly, embodiments of the present invention may take the form of an entirely hardware embodiment, an entirely software embodiment (including firmware, resident software, microcode, etc.) or an embodiment combining software and hardware embodiments that may all generally be referred to herein as a "circuit," "module" or "system." Furthermore, embodiments of the present invention may take the form of a computer program product, embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 illustrates a block diagram of a computing system for implementing an embodiment of the present invention. The computing system includes a computing device 110, which in turn includes a processing unit 112, a system memory 114, and a system bus 116 that couples various system components including the system memory 114 to the processing unit 112. The system bus 116 may be any of several types of bus architectures, including a memory bus, a memory controller, a peripheral bus, and a local bus using any of a variety of bus architectures, such as PCI. The system memory 114 includes a Read Only Memory (ROM) 118 and a Random Access Memory (RAM) 120. A Basic Input/Output System (BIOS) 122, containing the basic routines that help to transfer information between elements within the computing device 110, such as during start-up, is stored in the ROM 118. The computing device 110 further includes a Hard Disk Drive (HDD) 124 as computer-readable storage media. The HDD 124 is connected to the system bus 116 by an HDD interface 126. The HDD 124 provides a non-volatile storage for computer-readable instructions, data structures, program modules, and other data for the computing device 110. Although the exemplary environment described herein employs the HDD 124, it should be appreciated by those skilled in the art that other types of computer-readable storage media, which can store data that is accessible by computer, such as RAM, ROM, removable magnetic disks, removable optical disks, and the like may also be used in the exemplary operating environment.

A number of program modules may be stored on the HDD 124, including an operating system 128, one or more application programs 130, other program modules 132, program data 134, and a database system 136. The operating system 128, the one or more application programs 130, the other program modules 132 and program data 134 may be loaded onto the system memory 114 and specifically onto the RAM 120 during the functioning of the computing device 110. A user may provide commands and information through input devices, such as a keyboard, and receive output through peripheral output devices, such as monitor, speaker, printer, etc. These input and output devices are often connected to the processing unit 112 through an I/O adapter 140 coupled to the system bus 116.

In a networked environment, the computing device 110 may be connected to a remote computing device 142 through a network interface card 144. It will be appreciated that the network connections shown are exemplary, and any conventional means 141 of establishing communications links between the computers, such as a local area network, wide are network or wireless connection, may be used. In a networked environment, program modules depicted relative to the computing device 110, or its components, may be stored in a remote memory 146. The remote computing device 142 may be a personal computer, a router, a server, a network PC, a peer device, or other common network device.

Figures 2, 3:
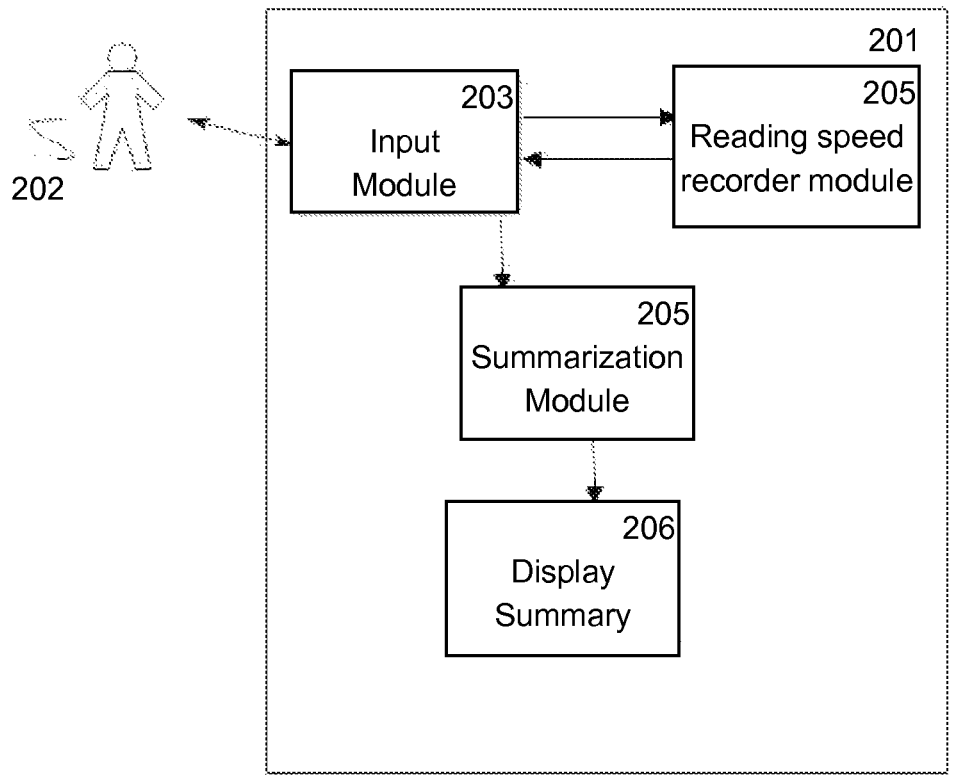
FIG. 2 illustrates a block diagram of a system for implementing embodiments of the present invention.
FIG. 3 illustrates a matrix of reading speeds and corresponding summary lengths.

Those of the ordinary skill in the art will appreciate that the hardware in FIG. 1 is a basic computing system and may vary. The architecture of the aforementioned computing device is not limiting and is only depicted as an example on which an embodiment of the present invention may be implemented. Other types of computing system such as a smart phone or a web-kiosk are well within the intended scope on which an embodiment of the present invention may be implemented FIG. 2 illustrates a block diagram of a system for implementing embodiments of the present invention. A reading device 201 used by a reader 202 for summarizing a document may be a device comprising a computing system as shown in FIG. 1. The reading device 201, according to an embodiment, may comprise various modules to perform various operations as shown distinctively in boxes in FIG. 2 and described hereinafter. Each of the hereinafter described modules, which comprise computer program codes, may be configured to operate in conjunction with each other and incorporated in a software application running on the reading device 201 for summarizing the document. The reader 202 through an input module 203 seeks to summarize the selected document. The input module 203 may comprise a Graphical User Interface (GUI) to enable the reader 202 to select or receive a document for summarization. Selecting the document may include selecting the document stored within an internal memory of the reading device 201 or from an external memory accessible through the reading device 201. The input module 203 may additionally provide a framework to receive a reading speed of the reader 202. The method of receiving the reading speed of the reader 202 may vary according to embodiments. For example, the input module 203 may require the reader 202 to input a reading speed.

In one embodiment, the reading speed of a user is automatically determined according to how a particular user interacts with an e-reader, browser, e-mail system, etc. For example, assume that an e-reader displays one page at a time, and that each page contains 100 words. Assume further that a particular user turns to a next displayed page on the e-reader every 60 seconds. Thus, the reading speed for this user is 100 words per minute, which is automatically determined by a system detecting that each 100 word page is turned (i.e., replaced on the e-reader's display with a new 100 word page) every minute. Or course, each page may or may not contain exactly 100 words, but the system is able to determine exactly how many words are on each page, as well as how long a reader stays on each page before turning it, thus enabling the system to calculate the user's reading speed (in words-per-minute). A similar process is used to track how long a user stays on a webpage having a known number of words before switching to a new webpage; how long a user displays an e-mail having a known number of words before minimizing/closing the e-mail; etc.

Alternatively, the input module 203 may be configured to automatically retrieve a pre-determined reading speed of the reader. The pre-determined reading speed of the reader may be stored in a memory in communication with a computer implementing an embodiment of the invention. The pre-determined reading speed of the reader may be determined through a reading speed recorder module 204. The reading speed recorder module 204 may be a part of the aforementioned software application for summarizing the document or a separate software application running independently in the reading device 201 or in a separate computing device as shown in FIG. 1. The aforementioned determination of the reading speed of the reader may be through a suitable computer program code or algorithm embedded within the reading speed recorder module 204 and known to a person skilled in the art.

A summarization module 205, receives an input to summarize the document through the input module 203 along with the reading speed of the reader 202. The summarization module may comprise a pre-defined computer implemented algorithm known to a person skilled in the art to summarize the document. The summarization module 205, before generating a summary of the document, determines a summary length of the document. The aforementioned computer implemented algorithms known to a person skilled in the art for generating the summary of the document may be modified to generate the summary of the document of having a specific summary length based on the reading speed of the reader 202. The summary length is determined, according to an embodiment, from a table of reading speeds and corresponding summary length as shown in FIG. 3 stored in the reading device 201 or accessible to the reading device 201. The reading speed received by the summarization module 205 from the input module 203 is searched by the summarization module 205 in the aforementioned table to determine the appropriate summary length corresponding thereto. The document is summarized having the aforementioned summary length as determined. According to an embodiment, the unit of the reading speeds may be expressed in paragraph or pages or words per unit time and the corresponding summary lengths may be expressed in words.

The summarized document is subsequently displayed to the reader 202 through a display unit 206 of the reading device 201.

Figure 4:
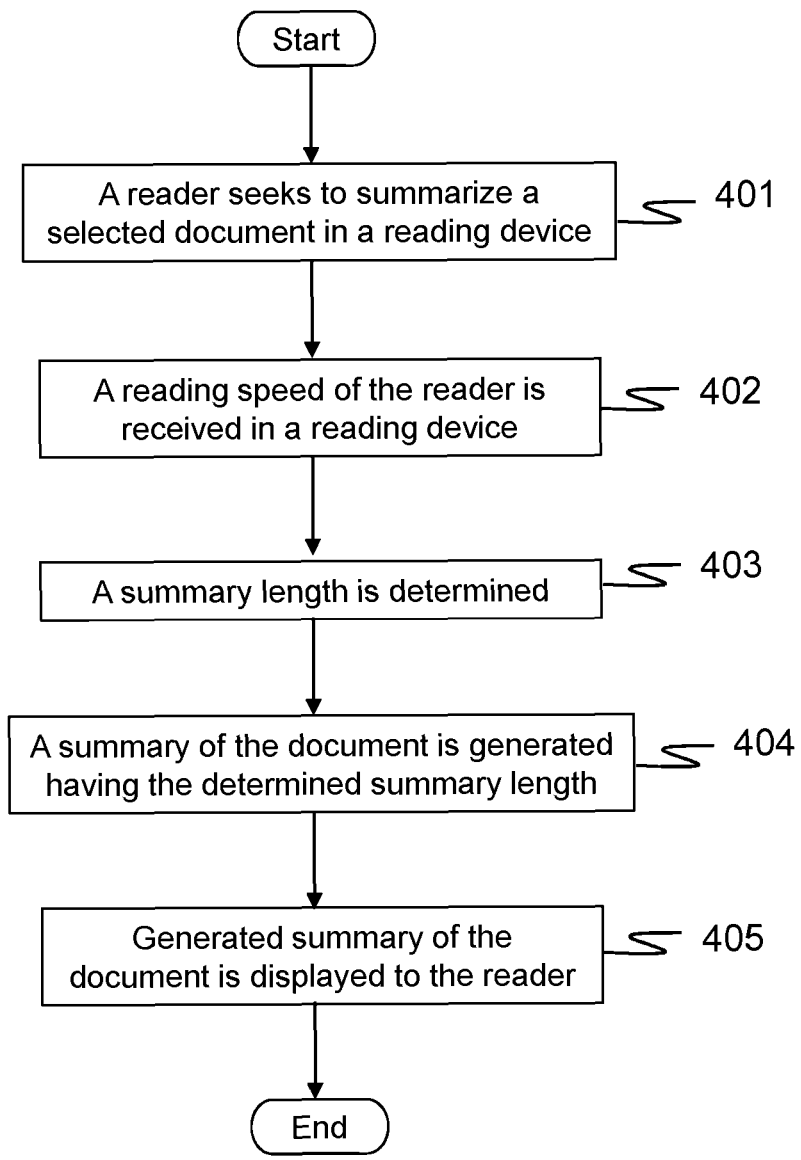
FIG. 4 illustrates a flowchart depicting steps to be performed for implementing an embodiment of the present invention.

FIG. 4 illustrates flowcharts depicting steps to be performed for implementing an embodiment of the present invention. At step 401, a reader seeks to summarize a selected document in a reading device. The reading device may be a device comprising a computing system as shown in FIG. 1. At step 402, a reading speed of the reader is received by the reading device before the document is summarized. The method of receiving the reading speed of the reader may vary according to embodiments. For example, the reader may input a reading speed. Alternatively, the reading device may be configured to automatically retrieve a pre-determined recorded reading speed of the reader stored in a memory in communication with the reading device.

At step 403, a summary length of the summary to be generated of the document is determined. The summary length is determined, according to an embodiment, from a table of reading speeds and corresponding summary length as shown in FIG. 3 stored in the reading device or accessible to the reading device. The reading speed received by the reading device is searched in the aforementioned matrix to determine the appropriate summary length corresponding thereto. According to an embodiment, the unit of the reading speeds may be expressed in paragraph or pages or words per unit time and the corresponding summary lengths may be expressed in words.

At step 404, a summary is generated having the determined summary length using pre-defined computer implemented algorithm known to a person skilled in the art to summarize the document.

At step 405, the generated summary of the document is displayed to the reader through a display unit of the reading device.

According to aforementioned embodiments, the document is summarized based on the reading speed of the reader.

While the present invention has been described as determining a length of a document summary according to a reading speed of a reader, in one embodiment the document summary is further customized according to identified interests of the reader. For example, assume that a document describes several topics, including "how to invest in stocks", "current geopolitical issues", and "popular culture" (i.e., current art, music, movies, etc.). Assume further that data mining shows that the reader is primarily interested in stock investments. This data mining can be performed by examining databases (e.g., browsing histories, e-mail folders, etc.) in order to determine what genres of e-books, webpages, etc. have been read by the reader; the content of e-mail and other electronic documents (e.g., blog postings) that the reader has generated; an educational and/or employment background of the reader; etc. Once the primary interest of the reader is ascertained by such data mining, then the summary of the document is modified to reflect the reader's interests. Thus, if the primary interest of the reader is stock investments, then the document summary is modified to describe information from the document that relates to stock investments.

In one embodiment, different identified interests of the reader are weighted (e.g., according to the frequency of readings/writings of the reader on different topics of interest), such that the summary of the document is modified to reflect these weights. Thus, in the document example above, if a reader has a reading/writing history of which 70% is related to stock investments, 20% is related to current geopolitical issues, and 10% is related to popular culture, then the length/content of the summary of the document will also reflect this same 70/20/10 breakdown. That is, 70% of the summary is devoted to (i.e., describes) stock investments, 20% of the summary is devoted to current geopolitical issues, and 10% of the summary is devoted to popular culture.

In another embodiment of the present invention, the interests (weighted or unweighted) of the reader are received by inputs from the reader. For example, a profile of the reader can be generated by the reader selecting and/or otherwise inputting different areas of interest to the reader. This profile is then used to modify/customize summaries of documents read by that particular reader.

The flowchart and block diagrams in the figures illustrate the architecture, functionality, and operation of possible implementations of systems, methods and compute program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
a processor and a computer readable memory, wherein the processor retrieves and executes instructions from the computer readable memory to perform a processor-implemented method comprising;
receiving a reading speed of a reader, wherein the reader is a human reader, wherein the reading speed is based on a first source;
determining a summary length of a summary of a document based on the received reading speed of the reader, wherein the document is a second source that differs from the first source, wherein a first reading speed is faster than a second reading speed, wherein the first reading speed results in a first summary length of the summary and the second reading speed results in a second summary length of the summary, and wherein the first summary length is longer than the second summary length;
generating a summary of the document having the determined summary length;
identifying an interest of the reader;
modifying the summary of the document according to the interest of the reader in order to include, in the summary of the document, content from the document that is of interest to the reader, wherein the reader has multiple interests;
weighting each interest from the multiple interests based on a reading history of the reader, wherein each interest is assigned a weight based on a percentage of the reading history of the reader that is devoted to said each interest;
generating a weight ratio of interests of the reader from the multiple interests based on the percentage of the reading history of the reader that is devoted to said each interest;
generating components of the summary based on the weight ratio of interests of the reader; and
modifying the summary of the document to match the weight ratio such that a ratio of lengths of the components of the summary matches the weight ratio of the interests of the reader.

2. The system of claim 1, wherein the processor-implemented method further comprises:
receiving the reading speed of the reader as an input from the reader.

3. The system of claim 1, wherein the processor-implemented method further comprises:
receiving the reading speed of the reader by automatically retrieving a pre-determined reading speed of the reader stored in a memory in communication with the system.

4. The system of claim 1, wherein the processor-implemented method further comprises:
determining the summary length from a pre-defined table of reading speeds and corresponding summary lengths.

5. A computer program product for summarizing a document, the computer program product comprising a non-transitory computer readable storage medium having program code embodied therewith, the program code readable and executable by a processor to perform a method comprising:
receiving a reading speed of a reader, wherein the reader is a human reader, wherein the reading speed is based on a first source;
determining a summary length of a summary of the document based on the received reading speed of the reader, wherein the document is a second source that differs from the first source, wherein a first reading speed is faster than a second reading speed, wherein the first reading speed results in a first summary length of the summary and the second reading speed results in a second summary length of the summary, and wherein the first summary length is longer than the second summary length;
generating a summary of the document having the determined summary length;
identifying an interest of the reader;
modifying the summary of the document according to the interest of the reader in order to include, in the summary of the document, content from the document that is of interest to the reader, wherein the reader has multiple interests;
weighting each interest from the multiple interests based on a reading history of the reader, wherein each interest is assigned a weight based on a percentage of the reading history of the reader that is devoted to said each interest;
generating a weight ratio of interests of the reader from the multiple interests based on the percentage of the reading history of the reader that is devoted to said each interest;
generating components of the summary based on the weight ratio of interests of the reader; and
modifying the summary of the document to match the weight ratio such that a ratio of lengths of the components of the summary matches the weight ratio of the interests of the reader.

6. The computer program product of claim 5, wherein the method further comprises:
automatically retrieving a pre-determined reading speed of the reader stored in a memory.

7. The computer program product of claim 5, wherein the method further comprises:
determining the summary length from a pre-defined table of reading speeds and corresponding summary lengths.

8. The system of claim 1, wherein the first source is an input from the reader that specifies the reading speed of the reader.

9. The system of claim 1, wherein the first source is a document that is read by the reader solely in order to determine the reading speed of the reader.

10. The system of claim 1, wherein the first source is memory that stores a pre-determined reading speed of the reader.

11. The system of claim 1, wherein the processor-implemented method further comprises:
determining the interest of the reader by examining a browsing history of the reader.

12. The system of claim 1, wherein the processor-implemented method further comprises:
determining the interest of the reader by examining web log (blog) postings by the reader.

13. The system of claim 1, wherein the processor-implemented method further comprises:
determining the interest of the reader by examining an educational background of the reader.

14. The system of claim 1, wherein the processor-implemented method further comprises:
determining the interest of the reader by examining an employment background of the reader.

15. The system of claim 1, wherein the processor-implemented method further comprises:
   determining the reading speed of the reader based on a frequency of the reader turning a page having a known number of words on an e-reader.

16. The system of claim 1, wherein the processor-implemented method further comprises:
   determining the reading speed of the reader based on a length of time that the reader stays on a first webpage having a known number of words before switching to a second webpage.

17. The system of claim 1, wherein the processor-implemented method further comprises:
   determining the reading speed of the reader based on a length of time that the reader displays an e-mail having a known number of words before closing the e-mail.

\* \* \* \* \*